United States Patent
Daage et al.

(10) Patent No.: US 6,465,529 B1
(45) Date of Patent: *Oct. 15, 2002

(54) PROCESS FOR INCREASING COBALT CATALYST HYDROGENATION ACTIVITY VIA AQUEOUS LOW TEMPERATURE OXIDATION

(75) Inventors: Michel Andre Daage; Russell John Koveal; Leroy Russell Clavenna, all of Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 30 days.

This patent is subject to a terminal disclaimer.

(21) Appl. No.: 09/628,407

(22) Filed: Aug. 1, 2000

(51) Int. Cl.⁷ .......................... C07C 27/00; B01J 20/34; B01J 21/08; C10L 1/04; C10G 71/00
(52) U.S. Cl. .................. 518/709; 518/700; 518/715; 502/20; 502/22; 502/23; 502/241; 502/325; 502/326; 208/15; 208/18; 208/61; 208/133
(58) Field of Search ................ 518/700, 715, 518/709; 502/20, 241, 22, 23, 325, 326; 208/61, 133, 15, 18

(56) References Cited

U.S. PATENT DOCUMENTS

| | | | |
|---|---|---|---|
| 2,369,956 A | 2/1945 | Feisst et al. | 260/449.6 |
| 2,542,558 A | 2/1951 | Naragon et la. | 252/416 |
| 3,661,798 A | 5/1972 | Cosyns et al. | 252/416 |
| 3,839,191 A | 10/1974 | Johnson | 208/108 |
| 4,670,414 A | 6/1987 | Kobylinski et al. | 502/174 |
| 4,729,981 A | 3/1988 | Kobylinski et al. | 502/259 |
| 4,978,689 A | 12/1990 | Bell et al. | 518/709 |
| 5,495,055 A | 2/1996 | Rueter | 568/881 |
| 5,728,918 A * | 3/1998 | Nay et al. | 585/733 |

FOREIGN PATENT DOCUMENTS

| EP | 0447005 A2 | 12/1991 | ............ B01J/37/02 |
|---|---|---|---|

OTHER PUBLICATIONS

A. Khodakow et al., Structural Modification of Cobalt Catalysts: Effect of Wetting Studied by x–Ray and Infrared Techniques, Oils & Gas Science and Technology–Rev. IFP. vol. 54 (1999). No. 4.

* cited by examiner

*Primary Examiner*—Jafar Parsa
(74) *Attorney, Agent, or Firm*—Jay S. Simon

(57) ABSTRACT

An aqueous low temperature oxidation (ALTO) process wherein a catalyst or catalyst precursor constituted of a solids support, or powder component, and a metal, or metals component, inclusive of cobalt, is oxidized, reduced and rendered catalytically active for conducting carbon monoxide hydrogenation reactions. The cobalt catalyst or cobalt catalyst precursor is thus contacted at low temperature with an oxidant in the presence of water (e.g., water to which an oxidant is added), sufficient to oxidize the cobalt metal, or metals component of the catalyst or catalyst precursor. On reduction, the hydrogenation activity of the cobalt catalyst is increased. All or a portion of the cobalt metal of the catalyst precursor is oxidized to form a $Co^{2+}$ cationic or oxo-anionic species at least during the initial phase of the reaction. On reduction, as may be produced by contact and treatment of the oxidized catalyst or catalyst precursor with hydrogen, or a hydrogen-containing gas, the catalytic metal, or metals component of the catalyst, is reduced to metallic metal, e.g., Co, and the catalyst thereby activated, and/or the catalytic activity increased.

22 Claims, No Drawings

PROCESS FOR INCREASING COBALT CATALYST HYDROGENATION ACTIVITY VIA AQUEOUS LOW TEMPERATURE OXIDATION

1. FIELD OF THE INVENTION

A process for the preparation of catalyst precursors, and catalysts made therefrom useful for conducting carbon monoxide hydrogenation reactions, especially Fischer-Tropsch reactions, and products made from such catalysts. It also relates to a process for producing, reactivating and/or increasing the activity of catalysts for use in conducting such reactions.

2. BACKGROUND

Processes for the hydrogenation of carbon monoxide to produce waxy and/or oxygenated products for upgrading to highly valued chemical materials and/or hydrocarbon fuels are well documented in the technical and patent literature. For example, in the Fischer-Tropsch (F-T) process, it is well known that the carbon monoxide component of synthesis gas can be catalytically converted by reaction with the hydrogen to reduction products constituting a range of waxy liquid hydrocarbons; hydrocarbons which can be readily upgraded to transportation fuels. In these processes, e.g., catalysts constituted of Group VIII metals (Periodic Table of the Elements, Sargent-Welch Scientific Company, Copyright 1968), notably the Iron Group metals, particularly iron, ruthenium and cobalt, are generally preferred for the synthesis of $C_5+$ hydrocarbons; and copper has become the catalytic metal of choice for alcohol synthesis. These metals can exist in multiple valence states, and each state can display quite different behavior from the others during the reduction treatments, hence impacting the catalytic properties of the active catalyst. Each of the metals can be promoted or modified with an additional metal, or metals, or oxide thereof, to improve, e.g., the activity and/or selectivity of the catalyst in conducting these reactions.

Iron Group metal surfaces exhibit higher activities for catalytic reactions such as hydrogenation, methanation and F-T synthesis when catalysts on which these metals are dispersed are subjected to high temperature oxidation, and subsequent reduction. Recent art can be found in Applied Catalysis, A, General 175 (1998) pp. 113–120 and references therein. U.S. Pat. Nos. 4,492,774; 4,399,234; 4,493,905; 4,585,789; 4,088,671; 4,605,679; 4,670,414 and EPO 253924 disclose activation of cobalt catalysts by means of a reduction/oxidation/reduction (R-O-R) cycle, resulting in an increase in activity for F-T synthesis. Thus, typically such catalyst, e.g., supported reduced Co in the form of either a freshly prepared catalyst, or a low activity or deactivated catalyst, is contacted at high temperatures ranging from about 300° to about 600° C. with a gaseous oxygen-containing stream to oxidize the metal, or metals, to a metal oxide form, e.g., $Co_3O_4$. Precautions are taken during such treatments to control the exothermicity of the reaction to avoid sintering of the oxide metal particles, an effect which can be detrimental to the activity of the catalyst. On reduction, i.e., on completion of the oxidation-reduction cycle, the dispersed oxide particles, e.g., the $Co_3O_4$, of the catalyst are reduced to dispersed metallic particles and the activity is increased or the fresh catalyst activated.

Considerable progress has been made in the development of catalysts, and processes, these providing good activity, and selectivity in alcohol synthesis, and in the conversion of hydrogen and carbon monoxide to distillate fuels, predominantly $C_5+$ linear paraffins and olefins, with low concentrations of oxygenates. Nonetheless, there remains a pressing need for improved catalysts, and processes; particularly processes for activating and regenerating such catalysts.

3. SUMMARY OF THE INVENTION

This need and others are achieved in accordance with the present invention relating to an Aqueous Low Temperature Oxidation (ALTO) process for the preparation of, or the activation or reactivation of a cobalt catalyst. The process requires, beginning with a cobalt catalyst or catalyst precursor constituted of a composite having a particulate solid support, or powder component, and a metal, or metals component, inclusive of cobalt at least a portion of which is present as metallic cobalt, catalytically active for conducting carbon monoxide hydrogenation reactions, especially F-T synthesis reactions, contacting the catalyst or catalyst precursor with an oxidant in the presence of water, at sufficiently low temperature to avoid complete evaporation of the water. On reduction, the hydrogenation activity of the cobalt catalyst or catalyst precursor is increased. The hydrogenation activity, especially the carbon monoxide hydrogenation activity of the catalyst precursor, is increased by oxidizing and converting at least initially all or a portion of the metal, or metals component of the catalyst or catalyst precursor to cationic or oxy-anionic species. By oxidation, as used in the ALTO process is meant the conversion of a catalytic metal species to an ionic state, e.g., the conversion of the $Co^o$ species to a $Co^{2+}$ species.

The ALTO process can be effected by contacting the catalyst or catalyst precursor in the presence of water at reaction conditions with gaseous oxidants or by using water-soluble or water miscible oxidants. Typically, the aqueous oxidizing liquid is water to which an oxidant is added. On contact of the catalyst or catalyst precursor with the aqueous oxidizing liquid, it is found that the catalytic metal(s) component thereof, at least a portion of that which is present as metallic cobalt, is transformed to a multitude of metal salts or compounds, including but not limited to metal hydroxides, nitrates, metal oxy-anions, oxyhydroxides, and the like. On reduction of the oxidized metal species, as may be produced by contact and treatment of the oxidized catalyst or catalyst precursor with hydrogen or a hydrogen containing gas, the oxidized metal, or metals is reduced to metallic metal or metals, e.g., Co; and the catalyst or regenerated catalyst thereby activated. Optionally, the oxidized catalyst or catalyst precursor may be dried. The metal compounds or salts formed during drying may be converted to metal oxides, i.e., CoO or $Co_3O_4$. In yet another option, the oxidized catalyst or catalyst precursor may be dried and calcined in an oxidizing atmosphere to obtain yet another oxidized catalyst precursor containing metal oxide or metal oxides, e.g., $Co_3O_4$. In both options, the catalyst or regenerated catalyst is activated by reduction of the oxidized catalysts or catalyst precursors. The catalyst precursors made from the catalyst or catalyst precursor via aqueous oxidation are useful for improving the performance, e.g., activity or selectivity of the activated or regenerated catalysts in carbon monoxide hydrogenation, especially F-T synthesis reactions.

The exothermicity of the ALTO treatment is effectively controlled by the high heat capacity and high heat transfer properties of a sufficient volume of liquid water. The reaction may be carried out at incipient wetness conditions or with an excess of water, resulting in a catalyst/water slurry. Upon completion of the reaction, excess water is eliminated by either filtration, decantation or by evaporation. By excess water is meant any water in excess of the volume necessary for filling the pore volume of the oxidized catalyst.

During the oxidation treatment, other metal salts or metal oxy-anion derivatives, e.g., perrhenic acid or salts, may be formed. When such salts or oxo-anions derivatives are soluble, it is preferable to use the evaporation or the incipient wetness methods in order to retain such metal salts on the catalyst surface. On completion of the oxidation treatment, the oxidized catalyst is then dried.

The metal compounds or salts as well as any metal oxy-anion(s) are intimately dispersed on the surface of the support, hence providing upon reduction with hydrogen or a hydrogen containing gas, metal (or metals) crystallites which are highly active species in carbon monoxide hydrogenation. Optionally, when the oxidized catalyst or catalyst precursor is calcined, the metal compounds or salts are converted to oxide particles without the deleterious effect of the intense exothermic reaction of directly converting a reduced metal in the higher valence oxide, $Co_3O_4$. The high performance of catalysts made by this process, and the fact that the ALTO step can be carried out at low temperature, are consequences of considerable importance in the development of an F-T process and in the improvement of the performance of the catalyst used in such processes.

4. DETAILED DESCRIPTION

The catalyst or catalyst precursor subjected to the ALTO treatment in accordance with this invention is characterized as the composite of a solid support, or powder component and a catalytic metal, or metals component inclusive of cobalt, all or a portion of which is present as metallic cobalt. It is obtained, e.g., by reduction of a precursor prepared by gellation, cogellation or impregnation techniques; e.g., precipitation of gels and cogels by the addition of a compound, or compounds of the catalytic metal, or metals, from solution as by addition of a base, or by the impregnation of a particulate solids support, or powder, with a solution containing a compound or salt of the catalytic metal, or metals. The treated composite is thus typically (i) a fresh catalyst precursor prepared by gellation, cogellation or impregnation techniques and reduced with a hydrogen containing gas or (ii) a catalyst used in a carbon monoxide hydrogenation reaction, comprising a substantial amount of reduced catalytic metal or metals; and the techniques used for obtaining such catalyst or catalyst precursors are well known to those skilled in the art. The catalytic precursor within the meaning of this invention is thus the harbinger composition which, when the reduced metal, or metals, is oxidized, by contact with an oxidant in the presence of water, and then reduced, as by contact with hydrogen, is comprised of sufficient of the dispersed reduced catalytic metal, or metals, that it is useful in catalyzing carbon monoxide hydrogenation reactions.

In the preparation of such catalyst precursor a metal, or metals, component, including particularly cobalt, catalytically active for conducting carbon monoxide hydrogenation reactions, especially F-T synthesis reactions, is composited with a particulate solids support, or powder, suitably a refractory inorganic oxide support, preferably a crystalline aluminosilicate zeolite, natural or synthetic, alumina, silica, silica-alumina, titania, or the like. For example, in impregnating a particulate support, or powder, the support or powder is contacted with a solution containing a salt, or compound, of cobalt; and if desired, an additional metal, or metals, preferably a Group VIIB or Group VIII metal, or metals, of the Periodic Table of the Elements (Sargent-Welch Scientific Company; Copyright 1968) to impregnate and deposit the metal, or metals, upon the powder or support. Exemplary of such metals are ruthenium, Re, Th, and the like, added to the cobalt to form the catalytically active metal component. Generally, from about 2 percent to about 70 percent, preferably from about 5 percent to about 25 percent metallic metal, or metals, inclusive of cobalt, is deposited upon the particulate solids support or powder, based upon the total weight (wt. %; dry basis) of the catalyst precursor (or finished catalyst). Catalysts having a relatively high metal, or metals, loading are preferred because these catalysts can be loaded into slurry bubble columns over a broad range of concentrations for activation, and use for conducting an F-T reactions up to that high concentration in which mixing and pumping the slurry becomes limiting. The impregnated powder or support is contacted with a reducing agent, suitably hydrogen at elevated temperature, to reduce the metal component to its lowest valence state, generally to metallic metal.

The catalyst precursor or catalyst, a composite constituted of a support component and a catalytic metal, or metals, component all or portion of which is in reduced metal form, is oxidized at low temperature by contact with water to which an oxidant has been added to form the oxidized catalyst precursor or catalyst. In conducting the ALTO treatment, at least the reduced cobalt metal, and preferably all of the reduced metals where there is an additional metal, or metals, are reacted to obtain the oxidation of all or a portion of said reduced metal or metals. The metal, or metals, in metallic state is (are) converted to cationic or oxo-anionic species. Unlike conventional oxidation with an oxygen containing gas as practiced, e.g., in R-O-R, the oxidation carried out in the presence of water is obtained at lower temperature, typically at temperatures lower than 200° C., preferably lower than 150° C., and most preferably lower than 100° C. In contrast, in a conventional R-O-R treatment with an oxygen containing gas to fully oxidize the metals requires temperatures higher than 200° C., and typically higher than 300° C. if more refractory metal, e.g., rhenium, is present on the catalyst. For example, in an ALTO treatment of a $Co/TiO_2$ catalyst or catalyst precursor slurred in water with an added oxidant converts, at least initially, all or a portion of the cobalt metal particles to Co ions.

In the ALTO treatment all or a portion of the cobalt, and all or a portion of an additional catalytic metal, or metals, of the metal, or metals component of the catalyst or catalyst precursor is oxidized to metal ions or metal oxy-anions, e.g., $Co^{2+}$ or $ReO_4^-$. Temperatures ranging from about 0° C. to about 200° C., preferably from about 10° C. to about 150° C., and most preferably from about 15° C. to about 120° C. are used in the ALTO treating step. Preferred operating conditions are dependent upon the nature and concentration of the oxidant that has been added to the water. Pressure can be set to any value compatible with the design of the process. The amount of water added to the catalyst ranges from the incipient wetness volume to large excess up to 100 times the volume of treated catalyst. The oxidant may be added as a gaseous oxidant bubbling in the catalyst/water slurry. Typically, when a gaseous oxidant is bubbled into the liquid excess water is added, usually more than twice the volume of catalyst. Appropriate gaseous oxidants include, but are not limited to, oxygen containing gas, e.g., air, an ozone or nitrogen oxide containing gases. It may be preferable to operate at pressure higher than atmospheric pressure when the oxidant solubility in water is limited, e.g., when treating with air. In a preferred mode of operation, the oxidant is added as an aqueous solution of a soluble compound, which include, but are not limited to, nitrate derivatives, such as nitric acid, hydroperoxides and peroxides, e.g., hydrogen peroxide. Oxidants containing known poisons of the said catalyst or catalyst precursor are preferentially avoided, e.g., Cl, Br, P and S when the catalyst is employed in carbon monoxide hydrogenation process. The concentrations of oxidant vary from a low of 5 parts per million (ppm soluble $O_2$ in water for example) to about 50 wt. %, preferably from about 10 ppm to about 30 wt. %. Contact times may vary from few seconds to about 24 hours. In general, preferred contact times depends upon the metal particle size, metal loading, the mode of operation and the concentration and nature of the oxidants. For example larger metal particle would require longer contact times because the oxidation of the inner core of the metal particle is generally diffusion limited. The mode of operation is also affected by the contact times. When a gaseous oxidant is bubbled into the catalyst/water slurry and the concentration dissolved in the water is low, longer contact times are required typically 2 hours to 48 hours, preferably 4 to 16 hours. Contacting times need to be at least sufficient to provide enough oxidant to obtain the desired level of oxidation of the metal particles. When water-soluble oxidants are used, the reaction rate depends upon the concentration and can be much faster. Typically, contact times vary from 15 seconds to 4 hours, preferably 1 to 60 minutes. The amount of soluble oxidant added is sufficient to provide the desired level of oxidation. Preferably, the amount of oxidant is sufficient to complete the oxidation of the metal or metals, and most preferably an excess of oxidant is used. The preferred mode of operation is the addition of the solution in incipient wetness conditions, which may be carried out in multiple steps. When excess water is used, the evaporation method is preferred to the filtration method, especially if the metals are oxidized to soluble salts such as oxo-anionic salts, e.g., perrhenates.

The ALTO process may be carried out in any suitable reactor, including but not limited to fixed bed or slurry reactors. For example, in a fixed bed operation, the oxidant/water mixture is added in a flow-through mode. Typically, the fixed bed may be flooded to fill the void volume of the bed or alternatively operated in trickle-flow regime. For an external operation associated with the use of a bubble column or a moving bed, the oxidation may be carried in a batch or continuous mode.

After the removal of excess water, the catalyst or catalyst precursor is preferably dried, and contacted with hydrogen, or a hydrogen containing gas, at elevated temperature, preferably at temperature ranging from about 200° C. to about 600° C., or preferably from about 300° C. to about 450° C., at hydrogen partial pressures ranging from about 0.1 atm to about 40 atm, sufficient to convert the metal compounds or salts to essentially the zero valent state of the metal thereof, i.e., metallic metal. Most preferably, prior to the reduction treatment, the catalyst or catalyst precursor may be further treated at high temperature in presence of an inert gas or oxygen containing gas. In conducting the reaction, temperature ranges generally from about 100° C. to about 700° C., preferably from about 200° to about 600° C. Thermal or calcination treatments commonly used in the decomposition of metal salts, particularly nitrates and hydroxides to form refractory oxides are appropriate.

The catalysts, or oxidized catalyst precursors after they have been reduced are used in a hydrogenation process, preferably a carbon monoxide hydrogenation process, particularly one wherein liquid, gaseous or solid hydrocarbon products are formed by contacting a syn gas comprising a mixture of $H_2$ and CO with the F-T hydrocarbon conversion catalyst of this invention under water gas shifting or non-shifting conditions; but preferably non-shifting conditions in which little or no water gas shift reaction occurs, particularly when the catalytic metal comprises Co, particularly Re or Ru or mixtures of one or both of these metals with cobalt.

The hydrocarbons produced in the F-T hydrocarbon conversion process are typically upgraded to more valuable products by subjecting all or a portion of the $C_5+$ hydrocarbons to fractionation and/or conversion. By "conversion" is meant one or more operations in which the molecular structure of at least a portion of the hydrocarbon is changed and includes both non-catalytic processing, e.g., steam cracking, and catalytic processing, e.g., catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

The following examples are illustrative of the salient features of the invention. All parts, and percentages are given in terms of weight unless otherwise specified.

EXAMPLE 1

Preparation of Hydrogen Dewaxed Catalyst 104.6 g of a $CoRe/TiO_2$ catalyst/wax mixture, recovered at the end of a Fischer-Tropsch synthesis run, was loaded in a fixed bed reactor. The reactor was purged with a nitrogen flow for 45 minutes. The temperature was then raised to 110° C. and the nitrogen gas was replaced by a mixture of 10 mole % hydrogen in nitrogen. The temperature was raised to 150° C. Once the molten wax was drained out of the reactor, the gas was switched to pure hydrogen and the flow rate was established at 450 scc/min. The temperature was then steadily raised to 260° C. and additional wax was drained out. The catalyst was maintained at 260° C. for 3 hours to complete the reduction of the metal component. The reactor was cooled down and the hydrogen replaced with pure nitrogen when the temperature reached 150° C. After completion of the cooling to room temperature, the catalyst was then discharged and bottled under a nitrogen atmosphere. 86.6 g of reduced catalyst were recovered.

EXAMPLE 2

ALTO of $CoRe/TiO_2:HNO_3$ Method

Under a nitrogen atmosphere, 2.0 gm of catalyst of example 1 were placed in a small beaker and 2 cc of deionized water were added to wet the catalyst. When subjected to a magnetic field (small permanent magnet), the catalyst particles exhibited a high magnetic permeability characteristic of reduced cobalt. 2 cc of 0.5N nitric acid solution was then added dropwise to the wet catalyst and stirred. No heating was required since the reaction was exothermic. The temperature however was increased to 50° C. The pH of the solution increased to about 8.5 and $NH_3$ evolved. In about 10 minutes, the magnetic permeability of the catalyst had decreased very significantly, hence indicating an essentially complete oxidation of the cobalt metal. The catalyst particles were not attracted or moved about when subjected to the magnetic field of the small permanent magnet. Upon filtration, the solution was clear and did not show the characteristic pink coloration of dissolved cobalt, indicating that the cobalt remained on the catalyst.

EXAMPLE 3

ALTO of a CoRe/$TiO_2$:$NH_4NO_3$ Method

The oxidation of another sample of reduced catalyst was carried according to example 2, except that $NH_4NO_3$ was used as an oxidant instead of $HNO_3$. 80 mg of $NH_4NO_3$ were added as 1.7 cc of solution in deionized water was then added dropwise to the wet catalyst and the mixture was stirred and the temperature increased to 45° C. The pH of the solution increased to about 9.5 and $NH_3$ evolved. In about 5 minutes, the magnetic permeability of the catalyst had decreased very significantly, hence indicating an essentially complete oxidation of the cobalt metal. The catalyst particles were not attracted or moved about when subjected to the magnetic field of the small permanent magnet. No dissolution of cobalt was observed as indicated by the absence of pink coloration of the water.

EXAMPLE 4

ALTO of a CoRe/$TiO_2$:air Method

Under a nitrogen atmosphere, 2.0 g of catalyst (example 1) was placed in a round bottom flask. 100 cc of deionized water was then added. The flask was connected to an air supply and the flow of air was adjusted to obtain a vigorous agitation of the slurry. The temperature was raised to 90° C. The magnetic permeability of the catalyst particles was tested with a small permanent magnet at different time intervals. No decrease in magnetic permeability was observed during the first 2 hours. After 2 hours 45 minutes, the magnetic permeability had decreased and the catalyst particles were not attracted or moved about when subjected to the magnetic field of the small permanent magnet after 4 hours. After cooling to room temperature, the essentially completely oxidized catalyst was filtered and dried. No pink coloration of the solution was observed.

EXAMPLE 5

Preparation of a 45% Co/$SiO_2$ 67.33 g of $Co(NO_3)_2$*$6H_2O$ were dissolved in 95 cc of deionized water. The resulting solution was added to 50 g of fumed silica EH-5 to achieve incipient wetness conditions. The resulting catalyst precursor was then placed in a vacuum oven at 80° C. for 24 hours and calcined in flowing air for 2 hours at 300° C. A second and third incipient wetness impregnation were carried according to the method used for the first impregnation. After the final calcination the catalyst precursor had a nominal Co metal loading of 45%. 104.6 g of the calcined catalyst precursor was loaded in a fixed bed reactor and purged with nitrogen for 45 minutes and the temperature was raised to 110° C. A 10 mole % hydrogen in nitrogen gas mixture was introduced in the reactor and the temperature was raised to 150° C. At 150° C., the gas was switched to pure hydrogen and the temperature steadily increased to 375° C. and held for 3 hours. Upon completion of the reducing treatment, the reactor was cooled off to about 150° C. when the hydrogen was replaced with a nitrogen flow. The catalyst was discharged at room temperature under a nitrogen atmosphere and bottled for further use.

EXAMPLE 6

ALTO of a 45% Co/$SiO_2$:$NH_4NO_3$ Method

Under a nitrogen atmosphere, 2 g of 45% Co/$SiO_2$ (example 5) were mixed in a small beaker with 4.4 g of deionized water. The catalyst exhibited a high magnetic permeability when subjected to a magnetic field. 306 mg of $NH_4NO_3$ in 1.6 cc of water was added to the mixture and stirred. The resulting slurry was then placed on a hot plate and the temperature was raised to about 60° C. while continuously stirring. When the evolution of $NH_3$ stopped (about 30 minutes), the magnetic permeability appeared unchanged. A second addition of 306 mg of $NH_4NO_3$ in 1.6 cc of water was carried on and the mixture was brought to a slight boil. After the evolution of the $NH_3$ ceased, the magnetic permeability was still strong, indicating that only a fraction of the cobalt had been oxidized. The slurry was kept at room temperature overnight. When tested, the magnetic permeability of the catalyst was significantly reduced and about half of the catalyst particles had lost magnetic permeability. This example demonstrates that the oxidation of the reduced cobalt depends upon the metal loading and contacting time with the oxidant. It also indicates that the oxidation reaction may be diffusion limited for larger metal particle sizes and high metal loadings. The resulting solids were filtered, washed and dried. No pink coloration of the solution was observed.

EXAMPLE 7

ALTO of a 45% Co/$SiO_2$:air Method

Under a nitrogen atmosphere, 2.0 g of catalyst (example 1) was placed in a round bottom flask. 100 cc of deionized water was then added. The flask was connected to an air supply and the flow of air was adjusted to obtain a vigorous agitation of the slurry. The temperature was raised to 90° C. The magnetic permeability of the catalyst particles was tested with a small permanent magnet at different time intervals. No decrease in magnetic permeability was observed during the first 24 hours. It shows that air oxidation is not as effective as soluble oxidants when treating a high metal loading catalyst.

EXAMPLE 8

Preparation of ALTO Enhanced CoRe/$TiO_2$ 25.3 g of a CoRe/$TiO_2$ catalyst/wax mixture, recovered at the end of a Fischer-Tropsch synthesis run, was loaded in a fixed bed reactor. The reactor was purged with a nitrogen flow (500 cc/min) for 15 minutes. The temperature was then raised to 121° C. and held for 3 hours. The reactor was cooled back to room temperature overnight and hydrogen (50 cc/min) was fed. The temperature was steadily raised to 225° C. The nitrogen hydrogen mixture was adjusted to 10 vol. % and the temperature raised to 260° C. and held for 2 hours. The gas was switched to pure hydrogen and the temperature was held at 260° C. for 1½ hours. The reactor was then cooled under hydrogen flow and then purged with nitrogen at room temperature. The catalyst was discharged under a nitrogen atmosphere and bottled for further use. 17.5 g of catalyst (A) was recovered and separated in 5 batches of 3.40 g each. Each batch was impregnated by incipient wetness by adding 0.82 cc of $NH_4NO_3$ solutions of various concentrations. The nominal amount of $NH_4NO_3$ added to each batch were respectively: 0 mg (catalyst B), 77 mg (catalyst C), 155 mg (catalyst D), 310 mg (catalyst E) and 464 mg (catalyst F). Catalyst B was treated with deionized water and is used only as a reference. Upon completion of the incipient wetness impregnation, catalysts D, E and F exhibited a significant decrease in magnetic permeability, whereas catalysts B and C exhibited little to no decrease of magnetic permeability respectively. After about one hour of contacting, the catalysts B-F were then dried overnight in a vacuum oven at 80° C. and subsequently calcined in air at 300° C. for 2 hours.

EXAMPLE 9

Testing of ALTO-Treated $CoRe/TiO_2$ Catalysts

Each ALTO-treated catalyst (B-F) from EXAMPLE 8 were tested in a laboratory fixed bed reactor according to the following procedure.

The catalyst (2 cc) was mixed with quartz diluent (4 cc, 6.45 gm) and placed into a 1 cm inside diameter tubular reactor. The catalyst bed was held in place with a plug of glass wool at the bottom of the bed. A multipoint thermocouple was inserted into the catalyst bed to monitor temperatures. The catalyst was reduced with hydrogen at 375° C., 20 atm, and 315 sccm of $H_2$ for 2 hours. The catalyst was then cooled to 177° C., 20 atm, under a flow of 10 sccm Ar and 260 sccm $H_2$. After cooling, the feed composition was changed to 12 sccm Ar, 134 sccm $H_2$, and 94 sccm $CO/CO_2$ blend, giving a nominal feed composition of 56.3% $H_2$, 11.3% $CO_2$, 5.5% Ar, and 26.9% CO, where the percentages are given as mole percent. The reactor was then heated at 2.8° C./hr to 200° C. After reaching 200° C., the reactor was held at this condition for 24 hours. The pressure was kept constant at 20 atm. After 24 hours at 200° C., the reactor was heated at 2.8° C./hr to 213° C. The pressure was kept constant at 20 atm. This condition was held for the remainder of the test. $CH_4$ selectivity is defined as a carbon in the produced $CH_4$ as a fraction of the carbon from the converted CO.

The table below shows the results of the catalytic tests carried out on Catalyst B to G. It is clear that the activity and selectivity of the catalysts are enhanced, particularly when sufficient amount of $NH_4NO_3$ has been added (Catalyst E and F). The improvement of these catalysts over the untreated Catalyst G is particularly striking.

EXAMPLE 10

Preparation of Solvent Dewaxed Catalyst G

Chunks, weighing 83 grams, of $CoRe/TiO_2$ catalyst/wax mixture, recovered at the end of a Fischer-Tropsch synthesis run, were placed in a beaker and covered with toluene. The catalyst/wax mixture used in this example is from the same Fischer-Tropsch synthesis run as the catalyst/wax mixture used in Example 1. This material was heated to 85–90° C. and stirred by hand. The chunks broke up and then the toluene/wax solution was decanted. Fresh toluene was added, heated to 85° C., and stirred for about 5 minutes. The liquid was decanted. Fresh toluene was added once more, heated to 85° C., stirred for about 5 minutes, and decanted. The remaining toluene/catalyst slurry was transferred to a Buchner funnel and filtered hot. Hot toluene was poured onto the filter cake three times and drawn through the filter cake with applied vacuum. The filter cake was dried by drawing air through the cake. 58.4 grams of non-pyrophoric catalyst were recovered. The catalyst contained substantial amounts of reduced cobalt a indicated by its high magnetic permeability. The catalyst was easily moved about with a small permanent magnet.

EXAMPLE 11

Testing of Catalyst G

Solvent-dewaxed Catalyst G from Example 10 was treated in a laboratory fixed bed reactor in the same manner as described for ALTO-treated Catalysts B-F in EXAMPLE 9. The catalyst (2 cc, 2.8 gms) was mixed with quartz diluent (4 cc, 6.5 gm) and placed in a 1 cm inside diameter tubular reactor. The catalyst bed was held in place with a plug of glass wool at the bottom of the bed. A multipoint thermocouple was inserted into the catalyst bed to monitor temperatures. The catalyst was reduced with hydrogen at 375° C., 20 atm, and 315 sccm of $H_2$ for 2 hours. The catalyst was then cooled to 177° C., 20 atm, under a flow of 10 sccm Ar and 260 sccm $H_2$. After cooling, the feed composition was changed to a 12 sccm Ar, 134 sccm $H_2$, and 94 sccm $CO/CO_2$ blend, giving a nominal feed composition of 56.0% $H_2$, 11.6% $CO_2$, 4.9% Ar, and 27.5% CO, where the percentages are given as mole percent. The reactor was then heated at 2.8° C./hr to 200° C. After reaching 200° C., the reactor was held at this condition for 24 hours. The pressure was kept constant at 20 atm. After 24 hours at 200° C., the reactor was heated at 2.8° C./hr to 213° C. The pressure was kept constant at 20 atm. This condition was held for the remainder of the test. $CH_4$ selectivity is defined as the carbon in the produced $CH_4$ as a fraction of the carbon from the converted CO.

| Catalyst | $NH_4NO_3$ treat (mg/g)[1] | Activity (g HC/hr/kg) | $CH_4$ Selectivity (%)[3] | Days on feed |
|---|---|---|---|---|
| B | 0.0 | 384 | 7.0 | 4.4 |
| C | 22.6 | 390 | 9.4 | 4.4 |
| D | 45.6 | 371 | 8.4 | 3.4 |
| E | 91.2 | 546 | 6.8 | 4.4 |
| F | 136.5 | 488 | 7.1 | 4.4 |
| G | No Treatment | 219[2] | 8.0 | 1.9[2] |

[1]Activity is expressed in grams of total hydrocarbon produced per hour per kilogram of catalyst.
[2]Catalyst G activity at 1.9 days is shown because this is representative of the activity of this catalyst at the end of the Fischer-Tropsch synthesis run from where it was obtained. After 4.4 days, Catalyst G activity had dropped to only 135 g HC/hr/kg.
[3]$CH_4$ selectivity is defined as the percentage of carbon from the converted CO which is in the product $CH_4$.

The data show that increasing the oxidant treat rate results in improved catalyst performance. Catalyst performance is measured as a combination of catalyst activity and methane selectivity. Higher activity and lower methane selectivity are in the direction of increasing catalyst performance.

Having described the invention, what is claimed is:

1. A process for increasing the hydrogenation activity of a cobalt, catalyst, or for forming an oxidized cobalt catalyst precursor which, upon reduction can be converted to a cobalt catalyst for conducting carbon monoxide hydrogenation reactons, consisting essentially of:

contacting an oxidant, in the presence of water, with said catalyst or catalyst precursor characterized as a particulate solids composite consisting essentially of a support component, and a cobalt component at least a portion of which is present as metallic cobalt, while maintaining the oxidant and water at a temperature ranging from about 0° C. to 200° C. sufficient upon reduction, to increase the hydrogenation activity of the cobalt catalyst, or oxidize at least a portion of said cobalt metal component upon the surface of the particulate solids support of the catalyst precursor as a cobalt cationic or oxy-anionic species such that, on seduction, the carbon monoxide hydrogenation activity of the catalyst is increased.

2. The process of claim 1 wherein the cobalt metal component of the catalyst or catalyst precursor is present in concentration ranging from about 2 percent to about 70 percent, based on the total weight of the catalyst or catalyst precursor (dry basis).

3. The process of claim 2 wherein the cobalt metal component of the catalyst or catalyst precursor ranges in concentration of from about 5 percent to about 25 percent.

4. The process of claim 1 wherein the cobalt metal component of the catalyst or catalyst precursor is comprised of cobalt and a Group VIIB or Group VIII metal other than cobalt.

5. The process of claim 1 wherein the metal, or metals component of the catalyst or catalyst precursor is comprised of cobalt and ruthenium, or cobalt and rhenium.

6. The process of claim 1 wherein the oxidant is added to the water as a gas, or dispersed therein as a soluble compound.

7. The process of claim 1 wherein the oxidant is bubbled through the water as a gas, and the water through which the oxidant is bubbled is present in concentration greater than two times the volume of the catalyst or catalyst precursor.

8. The process of claim 7 wherein the gaseous oxidant is comprised of air, ozone or nitrogen oxide containing gases.

9. The process of claim 1 wherein the oxidant is added to the water as a water soluble compound.

10. The process of claim 9 wherein the water soluble oxidant compound is comprised of nitric acid, a hydroperoxide, or a peroxide.

11. The process of claim 1 wherein the oxidant is added to the water in concentration ranging from about 5 ppm (soluble $O_2$ in water) to about 50 percent by weight of liquid.

12. The process of claim 11 wherein the oxidant is added to the water in concentration ranging from about 10 ppm to about 30 percent.

13. The process of claim 1 wherein during the oxidation treatment the water to which the oxidant is added is present in concentration ranging from about an incipient wetness volume to about 100 times the volume of the catalyst or catalyst precursor being treated.

14. The process of claim 1 wherein the temperature maintained upon the oxidizing liquid ranges from about 0° C. to about 150° C.

15. The process of claim 14 wherein the temperature maintained upon the oxidizing liquid ranges from about 15° C. to about 120° C.

16. The process of claim 1 wherein the catalyst, or catalyst precursor, after treatment with the oxidant-containing water to form a cationic or oxy-anionic species is contacted with hydrogen at elevated temperature to increase the hydrogenation activity of the cobalt catalyst, or reduce said cationic or oxo-anionic species of the catalyst precursor, to form an active catalyst.

17. A process for producing $C_5+$ hydrocarbons by the hydrogenation of carbon monoxide by reaction with hydrogen at reaction conditions in the presence of a catalyst made pursuant to the process of claim 16.

18. A process for producing $C_5+$ hydrocarbons by the hydrogenation of carbon monoxide by reaction with hydrogen at reaction conditions in the presence of a catalyst made pursuant to the process of claim 16, and wherein at least a portion of the hydrocarbons formed are upgraded to more valuable products by at least one of fractionation and conversion operations.

19. The process of claim 18 wherein said $C_{5+}$ hydrocarbons are subjected to a catalytic process in which the molecular structure of a least a portion of said hydrocarbon is changed.

20. The process of claim 18 wherein said $C_{5+}$ hydrocarbons are subjected to a non-catalytic process in which the molecular structure of a least a portion of said hydrocarbon is changed.

21. The process of claim 19 wherein a diesel fuel is the product of said catalytic processes.

22. The process of claim 19 wherein a lubricant oil is the product of said catalytic processes.

* * * * *

UNITED STATES PATENT AND TRADEMARK OFFICE
CERTIFICATE OF CORRECTION

| | | |
|---|---|---|
| PATENT NO. | : 6,465,529 B1 | Page 1 of 1 |
| DATED | : October 15, 2002 | |
| INVENTOR(S) | : Michel Andre Daage, Russell John Koveal and LeRoy Russell Clavenna | |

It is certified that error appears in the above-identified patent and that said Letters Patent is hereby corrected as shown below:

<u>Column 11,</u>
Line 11, replace the word "seduction" with -- reduction --.

Signed and Sealed this

Fourth Day of February, 2003

JAMES E. ROGAN
*Director of the United States Patent and Trademark Office*